United States Patent
Kumar et al.

(10) Patent No.: US 10,198,331 B2
(45) Date of Patent: Feb. 5, 2019

(54) GENERIC BIT ERROR RATE ANALYZER FOR USE WITH SERIAL DATA LINKS

(71) Applicant: STMicroelectronics International N.V., Schiphol (NL)

(72) Inventors: Tejinder Kumar, Moga (IN); Rakesh Malik, Noida (IN)

(73) Assignee: STMicroelectronics International N.V., Schiphol (NL)

( * ) Notice: Subject to any disclaimer, the term of this patent is extended or adjusted under 35 U.S.C. 154(b) by 0 days.

(21) Appl. No.: 15/475,277

(22) Filed: Mar. 31, 2017

(65) Prior Publication Data

US 2018/0285225 A1   Oct. 4, 2018

(51) Int. Cl.
| | |
|---|---|
| G06F 11/22 | (2006.01) |
| G06F 11/263 | (2006.01) |
| G06F 11/273 | (2006.01) |
| G06F 11/07 | (2006.01) |

(52) U.S. Cl.
CPC .......... *G06F 11/221* (2013.01); *G06F 11/076* (2013.01); *G06F 11/263* (2013.01); *G06F 11/2733* (2013.01)

(58) Field of Classification Search
CPC .. G06F 11/221; G06F 11/263; G06F 11/2733; G06F 11/076
USPC ................... 714/705, 704, 712, 742
See application file for complete search history.

(56) References Cited

U.S. PATENT DOCUMENTS

| | | | | |
|---|---|---|---|---|
| 8,069,293 | B1 * | 11/2011 | Rogan ................... | G06F 13/385 370/248 |
| 8,793,541 | B2 * | 7/2014 | Hsu ....................... | G06F 11/2733 714/704 |
| 8,873,580 | B2 * | 10/2014 | Chandramouli ...... | H04W 28/10 370/466 |
| 9,035,443 | B2 * | 5/2015 | Bemanian ................ | G11C 5/04 257/686 |
| 9,465,019 | B2 * | 10/2016 | Lockhart ................ | G01N 25/58 |
| 9,727,519 | B2 * | 8/2017 | Randell ............... | G06F 13/4282 |
| 9,798,684 | B2 * | 10/2017 | Poulsen ................ | G06F 13/362 |
| 2005/0117511 | A1 * | 6/2005 | Tsujimoto ............... | H04L 41/00 370/229 |
| 2009/0096592 | A1 * | 4/2009 | Wu ......................... | H04B 3/542 307/66 |
| 2011/0090853 | A1 * | 4/2011 | Chandramouli ...... | H04W 28/10 370/329 |

(Continued)

OTHER PUBLICATIONS

Damle, et al: "Generic System for characterization of BER and JTOL of High Speed Serial Links," India Conference (INDICON), 2015 Annual IEEE 2015 (5 pages).

*Primary Examiner* — John J Tabone, Jr.
(74) *Attorney, Agent, or Firm* — Crowe & Dunlevy

(57) ABSTRACT

Disclosed herein is a test apparatus for a device under test. The test apparatus includes a voltage translator coupled to receive test data from the device under test, over a physical interface, using one of a plurality of I/O standards, with the voltage translator being capable of communication using each of the plurality of I/O standards. A programmable interface is configured to receive the test data from the voltage translator. A bit error rate determination circuit is configured to receive the test data from the programmable interface and to determine a bit error rate of reception of the test data over the physical interface based upon a comparison of the test data to check data.

20 Claims, 4 Drawing Sheets

(56) References Cited

U.S. PATENT DOCUMENTS

| | | | |
|---|---|---|---|
| 2012/0068229 A1* | 3/2012 | Bemanian | G11C 5/04 257/209 |
| 2013/0145212 A1* | 6/2013 | Hsu | G06F 11/2733 714/27 |
| 2014/0053628 A1* | 2/2014 | Lockhart | G01N 25/58 73/25.04 |
| 2014/0254647 A1* | 9/2014 | Stott | H04L 43/50 375/224 |
| 2015/0019915 A1* | 1/2015 | Kospiah | G06F 11/302 714/38.1 |
| 2016/0314087 A1* | 10/2016 | Poulsen | G06F 13/4291 |
| 2017/0060808 A1* | 3/2017 | Randell | G06F 13/4282 |

* cited by examiner

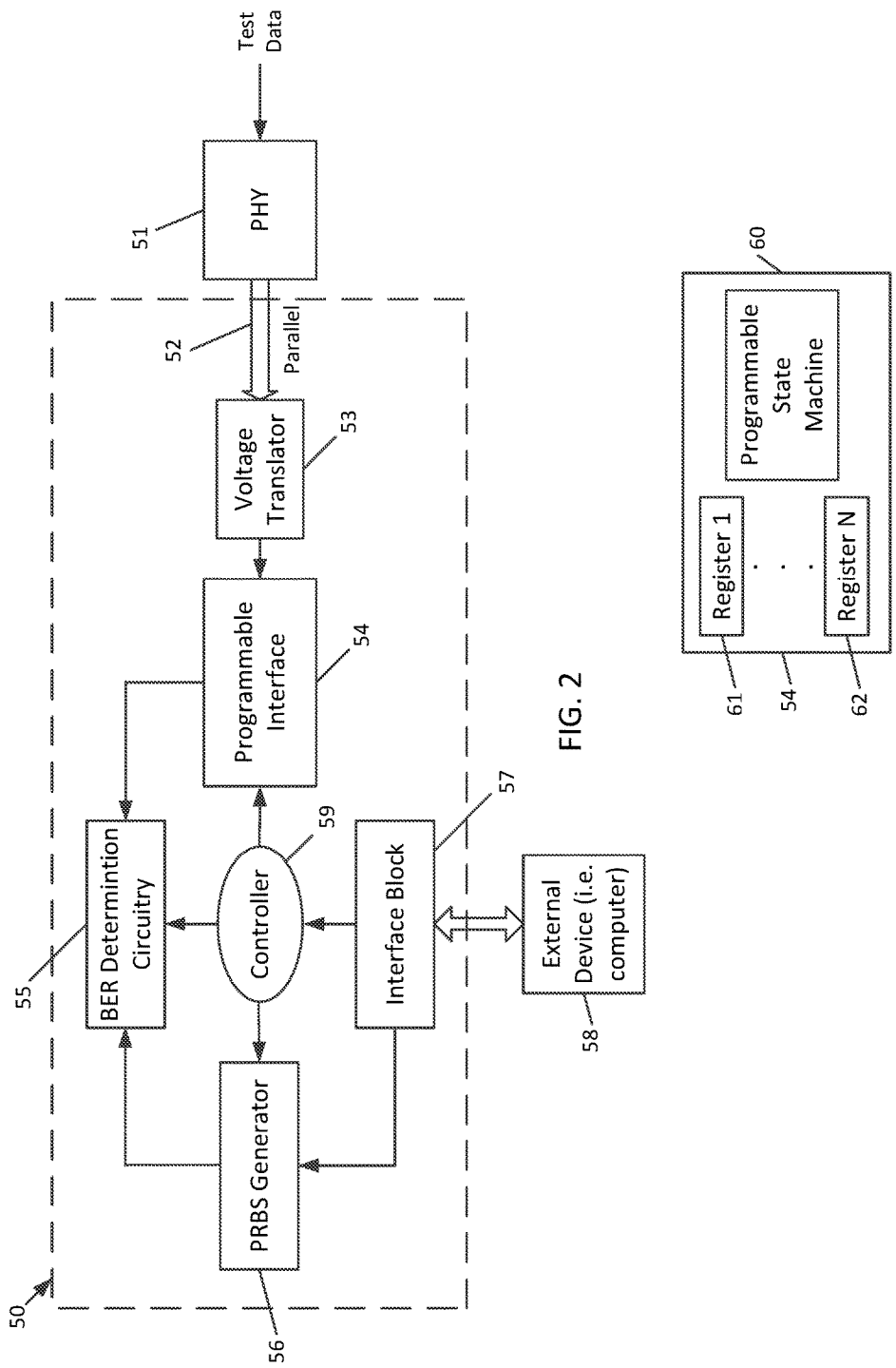

GENERIC BIT ERROR RATE ANALYZER FOR USE WITH SERIAL DATA LINKS

TECHNICAL FIELD

This disclosure related to a generic bit error rate analyzer that is usable in both on-chip and off-chip environments, and is capable of analyzing the bit error rate of multiple different types of serial data links.

BACKGROUND

High speed serial transceivers undergo bit error rate (BER) testing during characterization. The BER is the rate of occurrence of erroneous bits in data transmission or reception. This testing is performed using a BER analyzer, which can be located on-chip or off-chip.

An example of an off-chip BER analyzer 10 is now described with reference to FIG. 1A. The BER analyzer 10 includes a test data generator 12 and a BER analysis circuit 13. The device under test 16 includes a receiver 17 and a transmitter 18. A physical PHY receive channel 14 couples the test data generator 12 to the receiver 17, and a physical PHY transmit channel 15 couples the BER analysis circuit 13 to the transmitter 18.

The test data generator 12 generates a psuedo-random binary sequence for use as test data and transmits it to the device under test 16 over the PHY receive channel 14. The device under test 16 then transmits the test data back to the test apparatus 11, via the transmitter 18 and over the PHY transmit channel 15. The BER analysis circuit 13 receives the test data and determines the BER thereof by comparing the received test data to expected check data.

This off-chip BER analyzer 10 has a variety of drawbacks, however. For example, errors in the PHY receive channel 14 can affect the determined BER of the PHY receive channel 14. In addition, this off-chip BER analyzer 10 is unable to test a single channel protocol, such as USB 2.0. Furthermore, such off-chip BER analyzers 10 can be prohibitively costly. In addition, the BER testing of a variable burst-to-burst latency protocol (e.g. MIPI, MPHY, etc) with such off-chip BER analyzers 10 is not possible. In addition, in some cases, loopback between the PHY receive channel 14 and PHY transmit channel 15 may not be feasible, as these interfaces may not be pin to pin mapped.

The cost of an on-chip BER analyzer 20, such as that shown in FIG. 1B, may be less than that of an off-chip BER analyzer. Here, the device under test is an integrated circuit chip 22, and includes two separate and distinct physical channels, PHY1 23 and PHY2 25, that use different voltage levels and protocols in some cases. The channel PHY1 23 is coupled to a first BER analyzer circuit 24, while the channel PHY2 25 is coupled to a second BER analyzer circuit 26.

In operation, a test data generator 21 generates a psuedo-random binary sequence for use as test data and transmits it to the BER analyzer 20, over the channels PHY1 23 and PHY2 25, to BER analyzers 24 and 26. The BER analyzer circuits 24 and 26 determine the bit error rates of the channels PHY1 23 and PHY2 25.

As mentioned, this on-chip BER analyzer 20 is cheaper than an off-chip BER analyzer. However, it has drawbacks as well. For example, separate BER analyzer circuits 24 and 26 are needed for each channel PHY1 23 and PHY2 25. This means that this on-chip BER analyzer 20 increases the area overhead for applications in which multiple PHY channels are to be tested.

Consequently, further development in the area of bit error rate analyzers is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is a test apparatus for a device under test. The test apparatus includes a voltage translator coupled to receive test data from the device under test, over a physical interface, using one of a plurality of I/O standards, with the voltage translator being capable of communication using each of the plurality of I/O standards. A programmable interface is configured to receive the test data from the voltage translator. A bit error rate determination circuit is configured to receive the test data from the programmable interface and to determine a bit error rate of reception of the test data over the physical interface based upon a comparison of the test data to check data.

In some cases, a psuedorandom binary sequence generator may be configured to generate the check data and to send the check data to the bit error rate determination circuit.

In other cases, a memory may be configured to store the check data and send the check data to the bit error rate determination circuit.

An interface block may be configured to receive the check data, over a physical interface, and to send the check data to the memory. In some cases, the interface block may instead receive the check data, over a system bus, and to send the check data to the memory.

The programmable interface may be configurable to receive the test data at a plurality of data rates. The programmable interface may include a programmable state machine, and the interface with the physical interface can be customized by changing values of registers to meet specifications of a desired high speed serial PHY. This makes the system adaptable to different high speed serial standards.

The programmable interface may cooperate with the voltage translator to receive the test data from the device under test, over the physical interface, using one of the plurality of I/O standards. The programmable interface may be capable of communication using each of the plurality of I/O standards. In some cases, the programmable case may communicate using one I/O standard.

A controller may be configured to control operation of at least one of the bit error rate determination circuit and the programmable interface. The programmable interface may be configurable to receive the test data at a plurality of data rates, and may include at least one register configured to store configuration bits determining the data rate at which the programmable interface is configured to receive the test data. The programmable interface may be configurable to communicate with any high speed serial link physical interface by changing the values of its registers to meet the specifications of any high speed serial physical interface. The controller may be configured to set the configuration bits of the at least one register, or each register, of the programmable interface.

An interface block may be configured to receive user configuration settings for at least one of the programmable interface and the bit error rate determination circuit, over a physical interface, from an electronic device, and to send the user configuration settings to the controller.

Another aspect is directed to a system on a chip including a plurality of devices, with a multiplexer configured to receive, as input, test data from a selected one of the plurality of devices. A bit error analysis circuit includes a voltage translator coupled to receive test data from the multiplexer, over a physical interface, using one of a plurality of I/O standards, with the voltage translator being capable of communication using each of the plurality of I/O standards. A programmable interface is configured to receive the test data from the voltage translator and send the test data to the bit error rate determination circuit. A bit error rate determination circuit is configured to receive the test data from the programmable interface and to determine a bit error rate of transmission of the test data over the physical interface based upon a comparison of the test data to check data. An interface block configured to receive the check data, over a physical interface.

A method aspect includes testing a device with a test apparatus. The method performs this testing by receiving test data from the device, over a physical interface, using one of a plurality of input output (IO) standards, using a voltage translator capable of communication using each of the plurality of IO standards. The test data is received from the voltage translator at a programmable interface and is sent the test data to a bit error rate determination circuit. The test data is received at a bit error rate determination circuit and a bit error rate of received test data over the physical interface is determined based upon a comparison of the test data to check data.

The test apparatus may be configured for the testing by writing configuration bits to registers inside the programmable interface to configure the programmable interface to use the one of the plurality of IO standards so as to enable cooperation with the voltage translator to receive the test data over the physical interface. Stated another way, the test apparatus may be configured for the testing by writing configuration bits to registers inside the programmable interface to configure the programmable interface to interface it with parallel interface of any high speed serial link PHY. The voltage translator may be configured to communicate using the one of the plurality of I/O standards.

Testing may include enabling the bit error rate determination circuit, and then by the test apparatus by receiving the check data at an interface block, over a physical interface, using an interface block. In some cases, the device may receive the check data from the interface block at a memory, may store the check data in the memory, and may send the check data to the bit error rate determination circuit. In some cases, the check data may be generated using a psuedorandom binary sequence generator, and sending the check data to the bit error rate determination circuit.

BRIEF DESCRIPTION OF THE DRAWINGS

FIG. 2 is a block diagram of an off-chip, generic bit error rate analyzer in accordance with this disclosure.

FIG. 3 is a block diagram of the programmable interface of the generic bit error rate analyzer of FIG. 2.

DETAILED DESCRIPTION

Figure 1A:
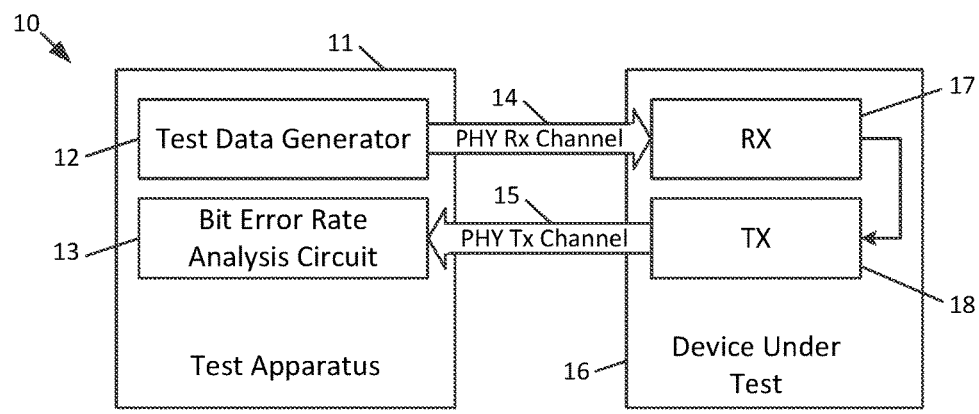
FIG. 1A is a block diagram of a prior art, off-chip, non-generic bit error rate analyzer.
Figure 1B:
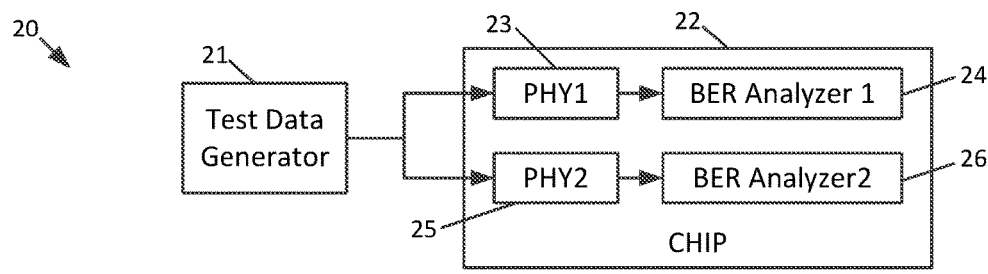
FIG. 1B is a block diagram of a prior art, on-chip, non-generic bit error rate analyzer.

One or more embodiments of the present disclosure will be described below. These described embodiments are only examples of the presently disclosed techniques. Additionally, in an effort to provide a concise description, some features of an actual implementation may not be described in the specification. When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Like numbers refer to like elements throughout, and prime notation is used to indicate alternative structures in similar embodiments.

With reference to FIG. 2, an off-chip bit error rate (BER) analyzer 50 for a physical layer PHY 51 of a device under test is now described. This BER analyzer 50 is, in this application, external to the PHY 51, and is not incorporated within the same chip as the device under test. The BER analyzer 50 includes a voltage translator 53 receiving test data from the PHY 51 over a parallel interface 52. The voltage translator 53 sends the received test data to programmable interface 54.

The programmable interface 54 sends the received test data to the BER determination circuitry 55. The BER determination circuitry 55 receives known good check data from a psuedo-random binary sequence generator 56, and compares the received test data to the check data to determine the bit error rate. This is performed in real time, with update results being stored in memory registers or registers together with statistics of these comparisons. The determined bit error rate can be saved to any suitable form of memory, such as block ram (BRAM).

It should be appreciated that this off-chip BER analyzer 50 is generic and may work with any type of physical interface or physical layer PHY. The voltage translator 53 is configurable to work with any of a variety of physical interfaces physical layers PHY, and serves to translate the received voltages of the test data to suitable device voltages for receipt by the programmable interface 54 for use in testing. The programmable interface 54 is configurable to operate using any type of interface protocol, such as USB 2.0, USB 3.0, or ethernet.

The programmable interface 54, as shown in FIG. 3, is comprised of a programmable state machine 60 for enabling the use of any interface protocol as described above, and registers 1 through N (shown as registers 61 and 62) contain settable configuration bits for determining how the state machine 60 operates. For example, the configuration bits may configure the state machine 60, and thus the programmable interface 54, for using any communication protocol.

A controller 59 is coupled to the programmable interface 54, BER determination circuitry 55, and PRBS generator 56, and serves to configure, control, activate, and deactivate these components. The controller 59 receives input from the interface block 57, which itself is configured to communicate with an external device 58 over a suitable interface, such as USB or ethernet. The external device 58 may be a computer, or any suitable electronic device. The interface block 57 may receive instructions from the external device 58, such as on how to configure the various components of the BER analyzer 50, what kind of physical interface is to be used by the PHY 51, what communication protocol is to be used, what kind of check data is to be used, etc. These configuration, control, activation, and deactivation functions may be performed in an initial set-up phase for the BER analyzer 50, or may be performed on the fly.

The interface block 57 can not only pass information and commands from the external device 58 to the controller 59, but can also pass information back from the controller 59 to the external device 58. This information from the controller 59 can include information received from the programmable interface 54, BER determination circuitry 55, and/or PRBS generator 56, such as the current configurations thereof, and such as the bit error rate.

In the case where an initial configuration phase for the BER analyzer 50 is performed, it includes, not necessarily in this order, (1) using the controller 59 to configure the PRBS generator 56 to generate a desired PRBS for use as check data (or to write a desired PRBS sequence into a memory, as will be explained below), (2) setting the registers 61, 62 within the programmable interface 54 to use a desired communications protocol, and (3) configuring the voltage translator 53 to receive as input the voltages of the transmitted test data using the desired communications protocol. Then, the BER determination circuitry 55 is enabled, and the test data is transmitted to the PHY 51. Operation thereafter proceeds as described above, with the BER determination circuitry 55 comparing the received test data to received check data to determine the bit error rate of the BER analyzer 50.

Figure 4:
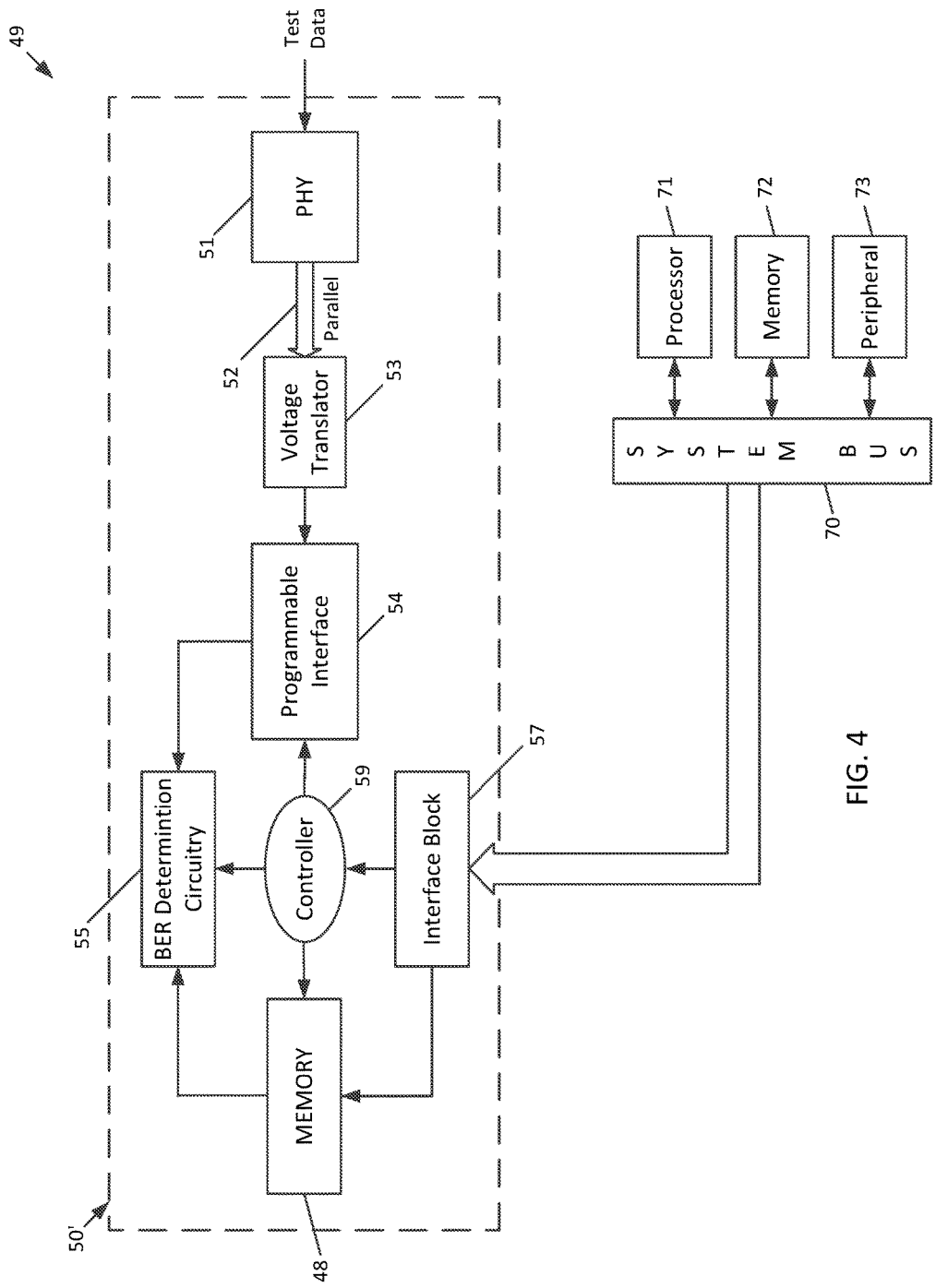
FIG. 4 is a block diagram of an on-chip, generic bit error rate analyzer in accordance with this disclosure.

Other configurations will now be discussed. As can be seen in the configuration of the BER analyzer 50' shown in FIG. 4, the BER analyzer 50' may be located on the same integrated circuit chip 49 as the devices it tests, and the interface block 57 may be connected to the system bus 70 of the integrated circuit chip 49. Other devices connected over the system bus 70 may, for example, be a processor 71, memory 72, and other peripheral 73 (for example, a MAC interface for ethernet communications, or a USB interface). The processor 71 may serve the same function as the external device 58 described above, and may thus send or receive data to the interface block 57. As can also be seen in this configuration, here, a memory 48 is used in place of a PRBS generator, and the memory stores the check data. The memory 48 can be any suitable type of memory, such as block ram (BRAM). Rather than using a separate memory, system memory can be shared.

It should be appreciated that, due to its capability of being controlled and reconfigured on the fly and in real time, the single BER analyzer 50' may function to test more than one PHY interface on-chip, without the use of additional BER analyzers 50', and without the use of more than one set of BER determination circuitry 55. These PHY interfaces may use different communications protocols.

Figure 5:
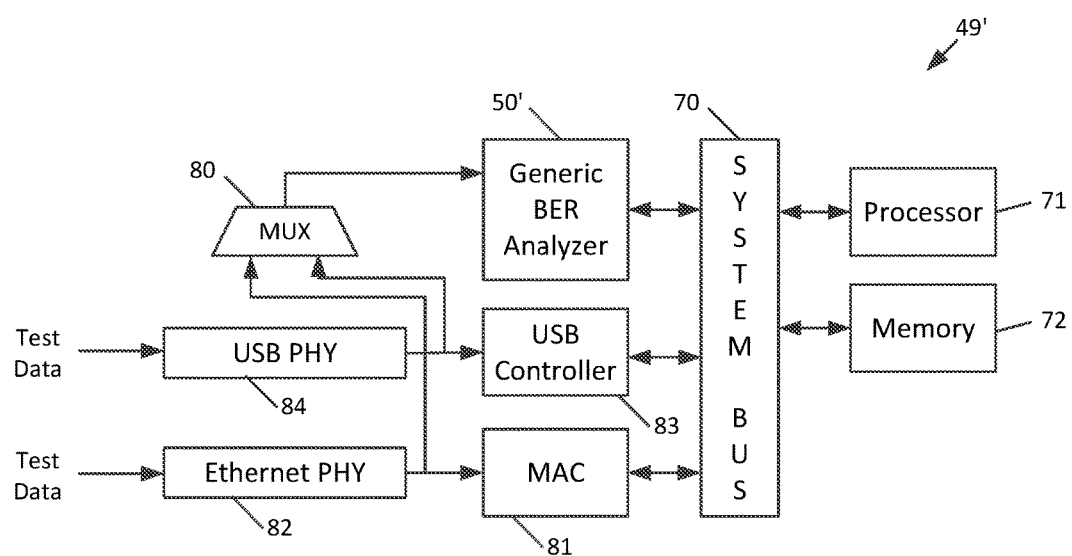
FIG. 5 is a block diagram of another embodiment of an on-chip, generic bit error rate analyzer in accordance with this disclosure.

This configuration is shown in FIG. 5. Here, the integrated circuit chip 49' includes a multiplexer 80 receiving test data from both an ethernet physical PHY interface 82 and a USB physical PHY interface 84. The ethernet PHY interface 82 and USB PHY interface 84 are respectively coupled to a media access control (MAC) device 81 and a USB controller 83, both of which are coupled to the system bus 70. The multiplexer 80 selectively switches which of the ethernet PHY interface 82 and USB PHY interface 84 are coupled to the generic BER analyzer 50', which determines the bit error rate thereof.

The off-chip BER analyzer 50' and on-chip BER analyzers 50 described above cure the deficiencies and drawbacks of prior art devices, and have a variety of advantages. For example, similar architecture can be used for both off-chip and on-chip designs, and can be used for any sort of physical interfaces or communications protocols, as explained above. In addition, as also described above, a single BER analyzer 50' can function to determine the bit error rate of multiple different PHY standards (that require different test patterns) in an on-chip environment, such as a system on a chip. Further, a true and accurate bit error rate is calculated, and be calculated for single channel protocols and variable burst-to-burst latency protocols. It should be appreciated that the BER analyzer 50' can be used to implement a built in self test for any suitable device.

The BER analyzer 50 could be implemented within a field programmable gate array (FPGA) or within an application specific integrated circuit (ASIC), and used for determining the bit error rate of any device under test It should also be understood that the BER analyzer 50' may function to switch between determining the bit error rate of any number of on-chip devices.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A test apparatus for a device under test, comprising:
   a voltage translator coupled to receive test data from the device under test, over a physical interface, using one of a plurality of I/O standards, wherein the voltage translator is configured to communicate using each of the plurality of I/O standards, and configured to translate the test data to translated test data;
   a programmable interface configured to receive the translated test data from the voltage translator, to format the translated test data, and to output formatted test data; and
   a bit error rate determination circuit configured to receive the formatted test data from the programmable interface and to determine a bit error rate of reception of the test data by the voltage translator over the physical interface based upon a comparison of the formatted test data to check data.

2. The test apparatus of claim 1, further comprising a pseudorandom binary sequence generator configured to generate the check data and to send the check data to the bit error rate determination circuit.

3. The test apparatus of claim 1, further comprising a memory configured to store the check data and send the check data to the bit error rate determination circuit.

4. The test apparatus of claim 3, further comprising an interface block configured to receive the check data over a second physical interface and to send the check data to the memory.

5. The test apparatus of claim 3, further comprising an interface block configured to receive the check data over a system bus and to send the check data to the memory.

6. The test apparatus of claim 1, wherein the programmable interface comprises a programmable state machine having an interface that is customizable through changing values in its registers to meet a specification of any high speed serial physical layer, thereby making the test apparatus adaptable to the plurality of I/O standards.

7. The test apparatus of claim 1, wherein the programmable interface operates at a single I/O standard; and wherein the voltage translator is configured to convert the test data from an I/O standard received at the physical interface to the single I/O standard.

8. The test apparatus of claim 1, further comprising a controller configured to control operation of at least one of the bit error rate determination circuit and the programmable interface.

9. The test apparatus of claim 8, wherein the programmable interface includes at least one register configured to store configuration bits enabling the programmable interface to meet specifications of a plurality of high speed serial physical layers; and wherein the controller is configured to set the configuration bits of the at least one register of the programmable interface.

10. The test apparatus of claim 8, further comprising an interface block configured to receive user configuration settings for at least one of the programmable interface and the bit error rate determination circuit over a second physical interface from an electronic device, and to send the user configuration settings to the controller.

11. A system on a chip, comprising:
a plurality of devices;
a multiplexer configured to receive, as input, test data from a selected one of the plurality of devices;
a bit error analysis circuit comprising:
  a voltage translator coupled to receive test data from the multiplexer over a physical interface using one of a plurality of I/O standards, wherein the voltage translator is configured to communicate using each of the plurality of I/O standards and to translate the test data to translated test data;
  a programmable interface configured to receive the translated test data from the voltage translator, to format the translated test data, and to output formatted test data;
  a bit error rate determination circuit configured to receive the formatted test data from the programmable interface and to determine a bit error rate of reception of the test data by the voltage translator over the physical interface based upon a comparison of the formatted test data to check data; and
  an interface block configured to receive the check data over a second physical interface.

12. The system on a chip of claim 11, further comprising a memory configured to receive the check data from the interface block, store the check data, and send the check data to the bit error rate determination circuit.

13. The system on a chip of claim 11, further comprising a controller configured to control operation of at least one of the bit error rate determination circuit and the programmable interface.

14. The system on a chip of claim 13, wherein the programmable interface comprises a programmable state machine having a programmable interface that is customizable through changing values in its registers to meet a specification of any high speed serial physical layer, thereby making the system on a chip adaptable to the plurality of I/O standards; and wherein the controller sets the values in each register.

15. A method, comprising:
testing a device with a test apparatus by:
  receiving test data from the device over a physical interface using one of a plurality of input output (IO) standards, wherein receiving uses a voltage translator configured to communicate using each of the plurality of IO standards and to translate the test data to translated test data;
  receiving the translated test data from the voltage translator at a programmable interface, formatting the translated test data, and sending the formatted test data to a bit error rate determination circuit; and
  receiving the formatted test data at the bit error rate determination circuit and determining a bit error rate of reception of the test data by the voltage translator over the physical interface based upon a comparison of the formatted test data to check data.

16. The method of claim 15, further comprising configuring the test apparatus for the testing by writing configuration bits to registers inside the programmable interface to configure the programmable interface to interface with a parallel interface of any high speed serial link.

17. The method of claim 16, wherein the test apparatus is further configured for the testing by enabling the bit error rate determination circuit.

18. The method of claim 15, wherein the device is further tested by the test apparatus by receiving the check data at an interface block over a second physical interface.

19. The method of claim 18, wherein the device is further tested by the test apparatus by receiving the check data from the interface block at a memory, storing the check data in the memory, and sending the check data to the bit error rate determination circuit.

20. The method of claim 15, wherein the device is further tested by the test apparatus by generating the check data using a pseudorandom binary sequence generator and sending the check data to the bit error rate determination circuit.

* * * * *